Patented Jan. 29, 1924.

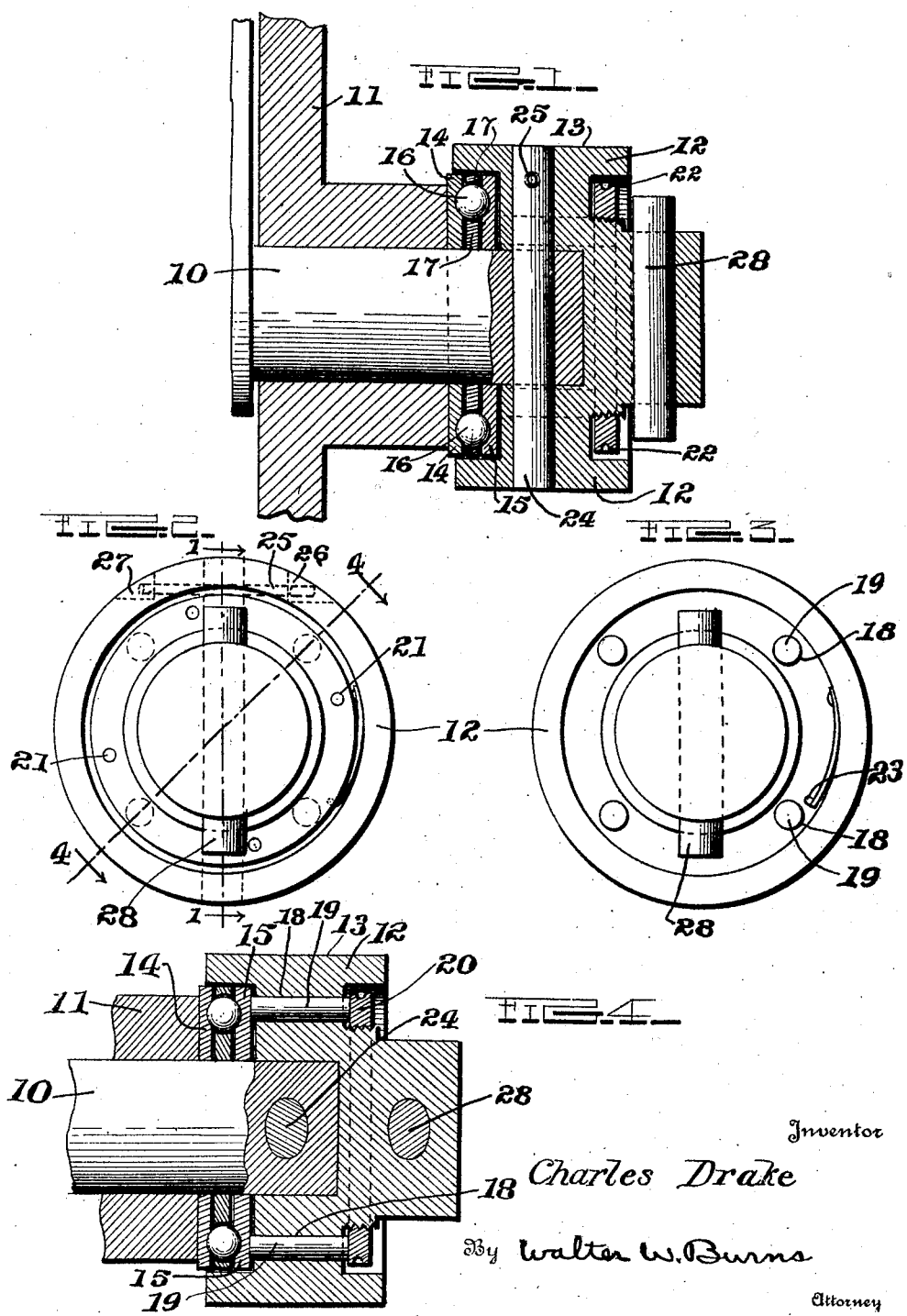

1,481,993

UNITED STATES PATENT OFFICE.

CHARLES DRAKE, OF EUDORA, KANSAS.

SHAFT-ADJUSTMENT DEVICE.

Application filed February 10, 1922. Serial No. 535,581.

*To all whom it may concern:*

Be it known that I, CHARLES DRAKE, residing at Eudora, county of Douglas, State of Kansas, a citizen of the United States, have invented certain new and useful Improvements in Shaft-Adjustment Devices, of which the following is a specification.

This invention relates to attachments for crank shafts and has particular relation to taking up end play thereof.

In the ordinary engine construction, slight wear on the bearings of crank shafts causes them to have end play which in turn causes the engine to be noisy. In order to cure this defect, it is necessary to take the engine down and replace the worn bearings by new ones. This causes great expense and loss of time.

The primary object of my invention is to provide a device which may be attached to the end of the crank shaft and which will serve to take up this wear without the necessity of taking down the engine and which will also serve as a pulley for the fan.

Another and further object is the provision of such a take up device that has provision for further taking up the end play in crank shafts when additional wear takes place.

Other and further objects will be apparent from the specification and claims.

Referring to the drawing where a preferred embodiment of my invention is illustrated, Fig. 1 is a cross sectional view showing a section of my attachment along the line 1—1 of Fig. 2.

Fig. 2 is a front elevation of my attachment.

Fig. 3 is a view similar to Figure 2 but with the adjusting nut removed.

Fig. 4 is a cross section on the line 4—4 of Fig. 2.

The same reference characters refer to similar parts throughout the several views.

10 designates the crank shaft of an engine, 11 the engine frame in which it has bearings, 12 designates the main body or rotatable member of this embodiment of my invention. On the outside of the member 12 is a surface 13 which may be used as a surface for contact of the fan belt.

14 and 15 designate opposite portions of a thrust bearing having balls 16 therebetween movably held in the retainer 17. Extending through holes 18 in the member 12 are push pins 19. The inner ends of the pins 19 are in position to engage the bearing member 15 as shown in Fig. 4. The outer ends of the pins 19 are engaged by a nut 20 which has a threaded engagement with a corresponding thread on the member 12. This nut 20 has openings 21 for the insertion of a spanner wrench and is provided on its outer periphery with openings 22 to receive a detent 23 shown in Fig. 3.

The member 12 is secured on the shaft 10 by means of a pin 24 which is in turn prevented from movement by the insertion of a split cotter 25. The periphery of the outer surface 13 is cut away as indicated at 26 and 27 to receive the ends of the cotter 25. A pin 28 is provided, in the outer end of the member 11, for the purpose of attaching the crank of the engine.

In attaching my invention to an already constructed engine, the cranking pin would first be removed. The bearings would then be slipped over the shaft. The member 12 would then be placed over the end of the shaft and the pin 24 driven therethrough and also through the hole in the shaft formerly occupied by the cranking pin. The push pins 19 would be then placed in the holes 18; after which the adjustable nut 20 would be screwed on until a point was reached where the end play was taken up by the thrust bearings. The spring detent 23 is now permitted to enter one of the holes 22 to hold the nut against accidental turning. The cranking pin 28 is now driven into its hole. This completes the assembling operation. If at a later time it is desired to take up further end play, it is only necessary to hold the spring detent 23 away from the openings 22 and turn the nut 20 until the pins 19 force the member 12 out and thus draw the shaft 10 to its outer position.

While I have described an embodiment of my invention in detail, I desire to have it understood that I do not limit myself to the exact construction shown and described but that modifications and changes may be made without departing from the spirit of my invention and within the scope of the appended claims.

Having described my invention, what I claim is:—

1. An attachment for a crank shaft comprising a rotatable pulley member securing means for holding the pulley member on the crank shaft, a thrust bearing, means coacting between the thrust bearing and the pulley member and movable in the direction of the shaft axis for limiting the movement of the crank shaft in an endwise direction.

2. An attachment for a crank shaft comprising a rotatable pulley member, securing means for holding the pulley member on the crank shaft, a thrust bearing, adjusting members movable axially relative to the pulley member and for causing the pulley member to occupy any one of a plurality of positions relative to the thrust bearing.

3. An attachment for a crank shaft comprising a rotatable member, securing means for holding the rotatable member on the crank shaft, a thrust bearing, push pins passing through the rotatable member and engaging the thrust bearing, means for simultaneously moving and for holding the push pins in any one of several adjusted positions.

4. An attachment for a crank shaft comprising a rotatable member, securing means for holding the rotatable member on the crank shaft, a thrust bearing, push pins passing through the rotatable member and engaging the thrust bearing, a nut having threaded engagement with the rotatable member and in position to hold the push pins in adjusted position.

5. An attachment for a crank shaft comprising a belt pulley, a pin for holding the pulley in position on the crank shaft, a thrust bearing, push pins passing through the pulley and in position to engage the thrust bearing, a nut having threaded engagement with the pulley and in position to hold the push pins in adjusted position, the pulley being provided with a cranking pin.

In testimony whereof I hereunto affix my signature.

CHARLES DRAKE.